United States Patent [19]

Ito et al.

[11] Patent Number: 5,773,519

[45] Date of Patent: Jun. 30, 1998

[54] PROCESS FOR PRODUCING MODIFIED CROSS-LINKED POLYMER PARTICLES

[75] Inventors: Nobuyuki Ito, Yokkaichi; Masayuki Hattori, Aichi-ken; Tohru Masukawa, Yokkaichi; Satoshi Ishikawa, Suzuka; Minori Kondoh, Yokkaichi, all of Japan

[73] Assignee: Japan Synthetic Rubber Co., Ltd., Tokyo, Japan

[21] Appl. No.: 814,480

[22] Filed: Mar. 10, 1997

Related U.S. Application Data

[63] Continuation of Ser. No. 389,193, Feb. 15, 1995, abandoned.

[30] Foreign Application Priority Data

Feb. 15, 1994 [JP] Japan ..................................... 6-039340

[51] Int. Cl.$^6$ .......................... C08F 267/06; C08F 289/00
[52] U.S. Cl. .......................... 525/276; 525/288; 525/301; 525/304; 525/306; 525/307; 525/309; 525/310; 525/315; 525/316; 525/902
[58] Field of Search ..................................... 525/301, 310, 525/902, 276, 288, 304, 306, 307, 309, 315, 316

[56] References Cited

U.S. PATENT DOCUMENTS

| | | | |
|---|---|---|---|
| 4,876,313 | 10/1989 | Lorah | 525/281 |
| 4,952,651 | 8/1990 | Kasai et al. | 526/201 |
| 5,189,107 | 2/1993 | Kasai et al. | 525/244 |

FOREIGN PATENT DOCUMENTS

| | | |
|---|---|---|
| 0 288 128 | 10/1988 | European Pat. Off. . |
| 0 534 057 | 3/1993 | European Pat. Off. . |
| 2-245056 | 9/1990 | Japan . |

*Primary Examiner*—Mark L. Warzel
*Attorney, Agent, or Firm*—Oblon, Spivak, McClelland, Maier & Neustadt, P.C.

[57] ABSTRACT

A process for producing modified cross-linked polymer particles which comprises polymerizing 0.01 to 900 parts by weight of (B) a monomer component containing 50% by weight or more of at least one member selected from the group consisting of aromatic monoalkenyl compounds, acrylic acid esters, methacrylic acid esters, fluoroalkyl acrylates, fluoroalkyl methacrylates, unsaturated carboxylic acids, conjugated diene compounds, vinyl esters and organosilane compounds in the presence of 100 parts by weight of (A) cross-linked polymer particles obtained by polymerizing a monomer mixture comprising 50% by weight or more of at least one cross-linking monomer selected from the group consisting of divinylbenzene, ethylene glycol dimethacrylate and trimethylolpropane trimethacrylate.

20 Claims, No Drawings

PROCESS FOR PRODUCING MODIFIED CROSS-LINKED POLYMER PARTICLES

This application is a Continuation of application Ser. No. 08/389,193, filed on Feb. 15, 1995, now abandoned.

BACKGROUND OF THE INVENTION

This invention relates to a process for producing modified cross-linked polymer particles suitable particularly for the modification of a resin and for use as an anti-blocking agent for resin film, a slip property improver for plastic film, an additive to a protective layer in a heat-sensitive recording material, a matting agent for photographic paper and the like.

Inorganic particles having a particle size of 0.1 to 10 $\mu$m are usefully employed as anti-blocking agents for resin film, easy lubricants for resin film, spacers, standard particles, antigen-antibody reaction test particles, running stabilizers for heat-sensitive paper, additives for toner, additives for cosmetics, rheology controller, low shrinking agent and the like.

However, inorganic particles are inferior in affinity to a dispersing medium when the particles are dispersed therein and lack elasticity, so that the inorganic particles have such a difficulty that materials contacted with the inorganic particles are damaged.

Therefore, in a part of the uses, the substitution of cross-linked polymer particles for the inorganic particles is under review.

In general, it has been impossible to produce cross-linked polymer particles, particularly those having a high content of a cross-linking monomer such as divinylbenzene or the like, by a conventional emulsion polymerization. However, the present inventors have found an effective process for producing cross-linked polymer particles and disclosed the same in U.S. Pat. No. 4,952,651 and U.S. Pat. No. 5,189,107.

However, the present inventors have found that when the cross-linked polymer particles produced by said process are applied to the above uses, the faults of the said inorganic particles can be overcome to some extent, but there is still a problem in affinity to dispersing medium.

In Japanese Patent Application Kokai No. 2-245,056 and the like, the affinity of a cross-linked polymer particle to a polyester film is improved by adding to the polyester film cross-linked particles covered with a low-cross-linked polymer by a grinding treatment.

However, according to the above processes for producing cross-linked polymer particles, it is difficult to allow the low-cross-linked polymer to be uniformly present on the surfaces of the cross-linked polymer particles, and when the cross-linked polymer particles thus obtained are added to a resin or the like, because of their insufficient improvement in affinity to the resin, the particles are flocculated and cannot be dispersed in the resin.

Also, when the cross-linked polymer particles are added to a resin film, in some cases, the cross-linked polymer particles are peeled from the resin when the laminated resin film is peeled, whereby the particles are scattered on the resin film to cause a bloom state.

These phenomena are caused by the lack of affinity of the cross-linked polymer particles to the resin. Usually, when the affinity of the cross-linked polymer particles to a resin is increased, a performance such as an anti-blocking effect or the like is not exhibited.

Moreover, according to such a grinding method, it was very difficult to control the particle sizes of the resulting particles, so that it was necessary to classify the particles after grinding to make the particle sizes uniform.

Under such circumstances, there have been desired cross-linked polymer particles which have an increased affinity to a resin, an increased dispersibility in a resin and a good anti-blocking property.

SUMMARY OF THE INVENTION

This invention has been made in the above-mentioned technical background of prior art and relates to a process for producing cross-linked polymer particles, on the surfaces of which a specific polymer is uniformly present.

An object of this invention is to provide a process for producing modified cross-linked polymer particles excellent in affinity to a resin, dispersibility in a resin, anti-blocking property and the like.

Other objects and advantages of this invention will become apparent from the following description.

According to this invention, there is provided a process for producing modified cross-linked polymer particles which comprises polymerizing 0.01 to 900 parts by weight of (B) a monomer component comprising 50% by weight or more of at least one member selected from the group consisting of aromatic monoalkenyl compounds, acrylic acid esters, methacrylic acid esters, fluoroalkyl acrylates, fluoroalkyl methacrylates, unsaturated carboxylic acids, conjugated diene compounds, vinyl esters and organosilane compounds in the presence of 100 parts by weight of (A) cross-linked polymer particles obtained by polymerizing a monomer mixture comprising 50% by weight or more of at least one cross-linking monomer (referred to hereinafter as the cross-linking monomer) selected from the group consisting of divinylbenzene, ethylene glycol dimethacrylate and trimethylolpropane methacrylate.

DETAILED DESCRIPTION OF THE INVENTION

The content of the cross-linking monomer in the monomer mixture used in the cross-linked polymer particles (A) is 50% by weight or more, preferably 60% by weight or more and more preferably 80% by weight of more. When the cross-linking monomer content is less than 50% by weight, the modified cross-linked polymer particles obtained become inferior in anti-blocking property.

As the cross-linking monomer, divinylbenzene is most preferable.

Also, as the monomers which can be polymerized together with the cross-linking monomer to form the cross-linked polymer particles (A), there are mentioned aromatic monoalkenyl compounds, acrylic acid esters, methacrylic acid esters, unsaturated carboxylic acids and the like. Specific examples of these monomers include those mentioned as to the monomer (B) hereinafter. Aromatic monoalkenyl compounds such as ethylvinylbenzene, styrene and the like are preferred.

In the method of producing the cross-linked polymer particles (A), suspension polymerization, emulsion polymerization and the like can be appropriately applied; however, it is preferable to polymerize the cross-linking monomer in the presence of seed particles.

In this case, the seed particles include particles composed of a polystyrene, an acrylic acid ester copolymer, a styrene/butadiene/acrylonitrile copolymer or the like, and among them, polystyrene particles are most preferable.

The weight average molecular weight of the polymer constituting the seed particles is preferably 500 to 15,000.

The cross-linked polymer particles (A) are produced by adding 3 to 100 parts by weight of the cross-linking monomer to 1 part by weight of the seed particles and polymerizing the cross-linking monomer while or after the cross-linking monomer is or has been absorbed in the seed particles.

In this invention, the average particle size of the cross-linked polymer particles (A) is not critical and is appropriately determined so as to obtain the aiming average particle size of the finally obtained modified cross-linked polymer particles.

The control of the average particle size of the cross-linked polymer particles (A) can be effected by adjusting the amount of an emulsifier, by adjusting the stirring degree or by other known means.

In this invention, the monomer component (B) to be polymerized in the presence of the cross-linked polymer particles (A) may contain a cross-linking monomer in a proportion of less than 10% by weight, preferably 8% by weight or less, more preferably 5% by weight or less and most preferably 0% by weight. When the content of the cross-linking monomer in the monomer component (B) is 10% by weight or more it becomes impossible to disperse the modified cross-linked polymer particles obtained in a resin.

The aromatic monoalkenyl compound which may be used as the monomer component (B) includes styrene, ethylvinylbenzene, α-methylstyrene, fluorostyrene, vinylpyridine and the like; the acrylic acid ester which may be used as the monomer component (B) includes butyl acrylate, 2-ethylhexyl acrylate, β-methacryloyloxyethyl hydrogenphthalate, N,N'-dimethylaminoethyl acrylate, 2-hydroxyethyl acrylate, glycidyl acrylate and the like; the methacrylic acid ester which may be used as the monomer component (B) includes 2-ethylhexyl methacrylate, methoxydiethylene glycol methacrylate, methoxypolyethylene glycol methacrylate, methyl methacrylate, ethyl methacrylate, butyl methacrylate, N,N'-dimethylaminoethyl methacrylate, glycidyl methacrylate and the like; the conjugated diene compound which may be used as the monomer component (B) includes butadiene, isoprene and the like; the vinyl ester which may be used as the monomer component (B) includes vinyl acetate and the like; the unsaturated carboxylic acid which may be used as the monomer component (B) includes acrylic acid, methacrylic acid, maleic acid, itaconic acid, fumaric acid and the like; the fluoroalkyl acrylate and methacrylate which may be used as the monomer component (B) include heptadecafluorodecyl acrylate, heptadecafluorodecyl methacrylate, β-(perfluorohexyl)ethyl acrylate, β-(perfluorohexyl)ethyl methacrylate, β-(perfluorooctyl)ethyl acrylate, β-(perfluorooctyl)ethyl methacrylate, β-(perfluoroisononyl) ethyl acrylate, β-(perfluoroisononyl)ethyl methacrylate and the like; the organosilane compound which may be used as the monomer component (B) includes tetramethoxysilane, tetraethoxysilane, methyltrimethoxysilane, methyltriethoxysilane, dimethyldimethoxysilane, dimethyldiethoxysilane and the like.

In this invention, it is preferable that the unsaturated carboxylic acid and a functional group-containing monomer such as 2-hydroxyethyl acrylate, glycidyl (meth)acrylate and the like are contained in the monomer component (B) in a proportion of 0.05 to 20% by weight, particularly preferably 0.1 to 15% by weight because the dispersibility in and adhesion to a resin of the modified cross-linked polymer particles obtained are enhanced.

The monomer component (B) is preferably a combinations of a polymerizable monomer such as aromatic alkenyl compound, acrylic acid ester, methacrylic acid ester or the like with a functional group-containing monomer, and particularly preferably a combination of an aromatic monoalkenyl compound with an unsaturated di- or mono-carboxylic acid.

Particularly preferable monomer components (B) are styrene, ethylvinylbenzene, methyl methacrylate, butyl acrylate and unsaturated carboxylic acids.

The amount of the monomer component (B) used is 0.01 to 900 parts by weight, preferably 0.1 to 500 parts by weight, more preferably 0.5 to 200 parts by weight, and most preferably 0.5 to 100 parts by weight per 100 parts by weight of the cross-linked polymer particles (A).

The monomer component (B) is preferably added to a reaction system in which the cross-linked polymer particles (A) are dispersed, and it is more preferable that a part or the whole of the monomer component (B) be added continuously or intermittently to the reaction system. Usually, the monomer component (B) is added subsequently to the production of the cross-linked polymer particles (A).

In the emulsion polymerization of the monomer component (B), a polymerization initiator may be used. The polymerization initiator is not critical and may be any one which is used in a conventional emulsion or suspension polymerization, including persulfate initiators such as potassium persulfate, sodium persulfate, ammonium persulfate and the like; azo type initiators; hydrogen peroxide; and organic peroxides. These may be used alone or in combination with various reducing agents such as ascorbic acid and the like.

In the above emulsion polymerization, a suspension-protecting agent or a surfactant may be used for enhancing the stability of the polymerization system.

The surfactant may be a conventionally used one, and includes, for example, anionic surfactants such as dodecylbenzenesulfonic acid salts; dodecyl sulfate salts, lauryl sulfate salts, dialkyl sulfosuccinate salts, polyoxyethylene alkylphenyl ether sulfuric acid salts, polyoxyethylene alkylpropenylphenyl ether sulfuric acid salts, formalin condensates of naphthalenesulfonic acid and the like. Here, the salts include sodium salts, ammonium salts and the like.

Moreover, it is possible to use a nonionic surfactant such as polyoxyethylene nonylphenyl ether, polyethylene glycol monostearate, polyoxyethylene alkylpropenylphenyl ether, sorbitan monostearate and the like.

It is also possible to use a generally known reactive emulsifier such as sodium naphthalenesulfonate or the like alone or in combination with the above-mentioned surfactant.

As a preferable suspension-protecting agent, there may be used a water-soluble high polymer such as polyvinyl alcohol, polyvinylpyrrolidone, carboxymethyl cellulose, sodium polyacrylate, hydroxypropyl cellulose or the like.

The above suspension-protecting agents may be used alone or in combination of two or more. The preferable combination is a combination of the anionic surfactant, the nonionic surfactant and the water-soluble high polymer.

When the organosilane compound is used as the monomer component (B), the monomer component (B) is polymerized by not emulsion polymerization but heat-condensation.

The weight average particle size of the modified cross-linked polymer particles of this invention is preferably 0.01 to 10 μm, more preferably 0.01 to 5 μm and most preferably 0.01 to 2 μm. When the weight average particle size is less than 0.1 μm, the anti-blocking property is inferior while when it exceeds 10 μm the affinity to a resin is inferior.

Here, the weight average particle size is measured as follows:

The weight average particle size of the cross-linked polymer particles is determined by directly measuring the diameters of 100 particles by means of a transmission electron microphotography (when the particle is not spherical, the long and short diameters thereof are measured and the average of the values obtained is used as the diameter) and then calculating the average of the 100 values obtained.

The weight average particle size and the number average particle size are calculated according to the following equations:

$$D_w = \sqrt[3]{\frac{\Sigma D_i^6 n_i}{\Sigma D_i^3 n_i}}$$

$$D_n = \frac{\Sigma n_i D_i}{\Sigma n_i}$$

$D_w$: Weight average particle size
$D_n$: Number average particle size
$D_i$: Particle size measured by a transmission electron microphotography
$n_i$: Number of particles having particle size of $D_i$ The ratio of the weight average particle size (Dw) to the number average particle size (Dn) of the modified cross-linked polymer particles of this invention (Dw/Dn) is preferably 1.2 to 3.0.

The glass transition temperature of the polymer obtained by polymerizing the monomer component (B) is preferably 200° C. or less, more preferably 150° C. or less.

It is preferable that the modified cross-linked polymer particles of this invention has a weight average particle size (Dw) within the range of 0.05 to 2 μm and the particle size distribution of the polymer particles satisfies the following conditions (1) and (2), because the viscosity of the water dispersion is not increased even when the solid concentration is increased, so that the polymerization stability and storage stability are good and handling is easy. Condition (1): the proportion of polymer particles on the large particle size side which particles have particle sizes larger than 1.3×Dw is 5% by weight or less based on the weight of the total polymer particles. Condition (2): the proportion of polymer particles on the small particle size side which particles have particle sizes smaller than 0.8×Dw is 2% by weight or more but 20% by weight or less based on the weight of the total polymer particles.

For this purpose, the weight average particle size (Dw) of the modified cross-linked polymer particles of this invention is in the range of preferably 0.05 to 2 μm, more preferably 0.1 to 1 μm, and most preferably 0.2 to 0.8 μm.

When the weight average particle size is less than 0.05 μm, the viscosity of the emulsion tends to become high and hence handling becomes difficult, so that the particles obtained become inferior in applicability. Also, since a large amount of an emulsifier becomes necessary, the coating film formed from such an emulsion becomes inferior in water resistance. On the other hand, when the weight average particle size exceeds 2 μm, the polymer particles tend to be settled and hence such a weight average particle size is not desirable.

Here, the proportion of the polymer particles having a particle size of more than 1.3 times the weight average particle size (more than 1.3×Dw) (polymer particles on the large particle size side) is preferably 5% by weight or less, more preferably 1% by weight or less, based on the weight of the total polymer particles. Since thus, the polymer particles on the large particle size side are little contained, excellent coating film characteristics (uniformity of coating film) due to the polymer particles are exhibited. When the proportion of the polymer particles on the large particle size side exceeds 5% by weight, the coating film characteristics are damaged, so that the gloss and surface smoothness of the coating film become inferior. When modified cross-linked polymer particles in which the proportion of the polymer particles on the large particle size side exceeds 5% by weight are used as a modifier, the smoothness of the film surface becomes bad, and hence, such problems occur that the film is wounded and a blooming phenomenon is caused.

The proportion of the polymer particles having particles sizes of less than 0.8 time the weight average particle size (less than 0.8×Dw) (polymer particles on the small particle size side) is preferably 1 to 35% by weight, more preferably 2 to 20% by weight, especially preferably 5 to 10% by weight based on the weight of the total polymer particles.

Since the proportion of the polymer particles on the small particle size side is more than 1% by weight, the particle size distribution of the polymer particles becomes broad and the solid concentration can be made high. That is to say, in a system having a broad particle size distribution, it is considered that polymer particles having intermediate particle sizes are present between polymer particles on the large particle size side, and the polymer particles on the small particle size side are present between the polymer particles having intermediate particle sizes, whereby a high solid content can be achieved. When the proportion of the particles on the small particle size side is less than 1% by weight, the particle size distribution of the polymer particles becomes substantially monodisperse, so that it becomes difficult to make the solid concentration high.

On the other hand, when the proportion of the polymer particles on the small particle size side exceeds 35% by weight, the viscosity becomes too high to achieve a high solid content, and when the particles are used as a modifier for a resin film, the anti-blocking property of the resin film cannot be sufficiently enhanced.

Moreover, the proportion of the modified cross-linked polymer particles having particle sizes of 0.9 to 1.1 times the weight average particle size (0.9×Dw to 1.1×Dw) is preferably 90% by weight or less, more preferably 80% by weight or less, based on the weight of the total polymer particles. Since the proportion of the polymer particles in such a particle size range is 90% by weight or less, the particle size distribution of the polymer particles becomes broad and the solid concentration can be made high. When this proportion exceeds 90% by weight, the particle size distribution of the polymer particles becomes mono-disperse, so that the solid concentration becomes difficult to heighten.

In order that the weight average particle size (Dw) of the modified cross-linked polymer particles satisfies the above-mentioned conditions (1) and (2), first of all, the amount of the seed polymer particles used (the total amount used and the ratio of the amount of the part previously charged to the amount of the remainder added) is adjusted, whereby the cross-linked polymer particles (A) satisfying the conditions (1) and (2) are prepared. In this case, the method of adding the seed polymer particles may be either (a) a method comprising previously charging a part of the seed polymer particles into a reactor and subsequently adding continuously or intermittently the remainder or (b) a method which comprises continuously or intermittently the whole of the seed polymer particles.

Secondly, the method of adding a monomer component comprising 50% by weight or more of the cross-linking monomer may be either (a) a method which comprises previously charging the whole of the monomer comprising 50% by weight or more of the cross-linking monomer into the reactor, (b) a method which comprises previously charging a part of the monomer component comprising 50% by weight or more of the cross-linking monomer and subsequently adding continuously or intermittently the remainder, or (c) a method which comprises adding the whole of the monomer component comprising 50% or more of the cross-linking monomer continuously or intermittently.

Preferable is a method which comprises effecting the polymerization while continuously or intermittently adding the part of the seed polymer particles and the monomer component comprising 50% by weight or more of the cross-linking monomer to a reactor into which a remainder of the seed polymer particles and a polymerization initiator have previously been charged.

In the above-mentioned seed emulsion polymerization method, the amount of the cross-linking monomer used is preferably 1 to 49 parts by weight per part of the seed polymer particles. When this amount is less than 1 part by weight, the proportion of the seed polymer particles becomes too large and the mechanical strength and thermal resistance of the cross-linked polymer particles obtained tend to become insufficient. On the other hand, the amount of the cross-linking monomer used exceeds 49 parts by weight, the monomer-absorption capacity of the seed polymer particles lacks and the amount of the monomer which has not been absorbed in the seed polymer particles increases, so that the polymerization stability is liable to be impaired.

Subsequently, the polymerizable monomer or monomers are polymerized in the presence of the thus obtained cross-linked polymer particles (A) which satisfy the above conditions (1) and (2), whereby the modified cross-linked polymer particles satisfying the above conditions (1) and (2) can be obtained.

The modified cross-linked polymer particles produced by applying such a seed emulsion polymerization method are particularly excellent in polymerization stability, storage stability and applicability and permit the solid concentration to be set high. The reason therefor is as follows.

In the emulsion polymerization, a large amount of small particles are generated at the initial stage of polymerization and flocculated and aggregated to produce nuclear particles which become the base of the objective polymer particles. It has been considered that polymerization proceed while said nuclear particles absorb the monomer or monomers to allow the particles to grow. However, in the conventional emulsion polymerization method, when the proportion of the cross-linking monomer in a monomer composition becomes at least several percentages by weight, the above nuclear particles cannot be aggregated owing to the cross-linking thereof and in addition the monomer absorption ability of the nuclear particles becomes small, whereby the subsequent growing of the particles due to the monomer absorption cannot be sufficiently achieved. Therefore, it follows that there exist many fine particles in the polymerization system, whereby the colloid-chemical stability is damaged and the polymerization stability becomes inferior.

On the other hand, when the above-mentioned seed emulsion polymerization method is applied, it becomes possible to effect the polymerization stably substantially regardless of the amount of the cross-linking monomer. By this method, it becomes possible to easily produce emulsions excellent in polymerization stability, storage stability and applicability, in which emulsion the cross-linked polymer particles having such particle sizes as to have been considered difficult to obtain by an emulsion polymerization method (weight average particle size: 0.05 to 2 $\mu$m) are dispersed.

When the particles are used as an anti-blocking agent or slip property improvers for plastic film or as a toner additive, it is preferable that the proportion of the modified cross-linked polymer particles having particle sizes of more than 1 $\mu$m be 1% by weight or less.

Specifically, the weight ratio of (C) the modified cross-linked polymer particles having particle sizes of 1 $\mu$m or more to (D) the modified cross-linked polymer particles having particle sizes of less than 1 $\mu$m is preferably 0–1:100–99 ((C) : (D)), more preferably 0–0.5:100–99.5, most preferably 0–0.1:100–99.9 and particularly preferably 0–0.005:100–99.995.

An explanation is made below of a physical method for the classification of particle size for removing the modified cross-linked polymer particles having particle sizes of more than 1 $\mu$m from a mass of modified cross-linked polymer particles obtained by polymerization.

As a physical method for classifying particles, there are a centrifugation method, a stream classification method, a diatomaceous earth filtering method and a filter filtration method, and these may be used in combination.

The centrifugation method is a method comprising centrifuging a mass of particles in the slurry state to settling coarse particles to remove the coarse particles. This centrifugation method may be a batchwise system by which centrifugation is conducted every time or a continuous system by which the mass of particles is continuously treated. The continuous system is preferred because a large amount of particles can be treated.

The stream classification method is a method comprising drying a mass of particles to form a powder, then spin dispersing in a rotating stream and classifying the particles by utilizing the centrifugal force applied to the particles and fluid resistance.

The diatomaceous earth filtration method is a method comprising subjecting a mass of particles in the slurry state to filtration treatment using diatomaceous earth or cellulose as a filter aid to agglomerate coarse particles and then removing the same. As the filter aid, diatomaceous earth is preferred because the coarse particles are easily adsorbed thereon.

The filter filtration method is a filtering method using a filter or filter cartridge. The filter (or filer cartridge) which can preferably be used includes membrane filter, membrane filter cartridge, pleated filter cartridge, depth filter cartridge, ceramic film filter and the like. Among them, pleats cartridge filter and depth cartridge filter are preferred from the viewpoint of high filtration precision, and the depth filter cartridge is particularly preferable because it has further a high dust collecting capacity. These filters (filter cartridges) can be used alone or in combination.

The filter material includes resins such as cellulose, nylon, polypropylene, polyethylene, epoxy resin, polyester, polytetrafluoroethylene and the like; glass fiber reinforced resins in which glass fibers are impregnated with the above resins; and inorganic materials such as metals such as stainless steel and the like, ceramics, glass fibers and the like. Among them, the resins and the glass fiber-reinforced resins are preferable in view of good compatibility with the mass of polymer particles, and resins such as nylon, polypropylene, polyethylene, epoxy resin, polyester, polytetrafluoroethylene and the like are particularly preferable because they are particularly excellent in compatibility with a mass of polymer particles. These filter materials can be used alone or in combination and formed into filters by a means such as heat-bonding or the like.

In the above filter filtration method, the pore size of the filter is preferably 1 to 10 times, more preferably 1 to 5 times and most preferably 1 to 3 times, the weight average particle size of the mass of the cross-linked polymer particles to be filtered.

The filtration method may be a method in which the filtration is conducted under pressure or reduced pressure by means of a pump. A pressure may be applied directly by nitrogen or air. The filtration method may be of a batchwise, continuous or circulating system.

Among the above-mentioned physical methods for classifying particles, the filter filtration method is the most preferable because the precision of removing coarse particles is the highest.

The application of the modified cross-linked polymer particles of this invention to various uses includes the following use modes:

(1) use in the emulsion form,
(2) use in the emulsion form followed by removing the dispersing medium, and
(3) use, in the form of powder, of polymer particles recovered from the emulsion.

The modified cross-linked polymer particles obtained by the process of this invention can be used as a modifier or slip property improvers for plastic film such as polyester film, polyolefin film or the like; a toner additive; fine polymer particles for electro-photographic developer; a heat-sensitive recording material; a shrink control agent for thermosetting resin composition; a matting agent for photographic paper; a printing material; a matting agent for photographic film; an ink-jet recording ink additive; or the like.

When the modified cross-linked polymer particles are used as, for example, a modifier or easy lubricant for a resin film such as polyolefin film or the like, the polyolefin film includes (1) a film consisting of a homopolymer of an α-olefin such as ethylene, propylene, 1-butene, 1-pentene, 1-hexene, 4-methyl-1-pentene or the like, (2) a film consisting of a copolymer of at least two members of the above-mentioned α-olefins with one another, (3) a film of a copolymer of an α-olefin with a monomer copolymerizable therewith (for example, vinyl acetate, maleic acid or the like) and (4) a film consisting of a mixture of the homopolymer and copolymer mentioned above.

The proportion of the modified cross-linked polymer particles contained in the polyolefin film is preferably 0.01 to 50% by weight, more preferably 0.05 to 30% by weight and most preferably 0.1 to 20% by weight.

When the proportion is less than 0.01% by weight, the polyolefin film obtained does not have sufficient antiblocking property, and when the proportion is more than 50% by weight, the mechanical properties of the polyolefin film obtained are deteriorated.

In order to incorporate the modified cross-linked polymer particles into a polyolefin, the polyolefin is mixed in the form of a powder or pellets sufficiently with the modified cross-linked polymer particles, thereafter the mixture is subjected to conventional melt-extrusion or monoaxial or biaxial orientation to produce a polyolefin film. Alternatively, the modified cross-linked polymer particles are added to a vinylidene chloride and the resulting mixture is coated on a conventional polyolefin film to produce a polyolefin film.

The form of the polyolefin film may be a tape form or a sheet form. The thickness of the film is preferably 5 $\mu$m to 5 mm, more preferably 5 $\mu$m to 1 mm and most preferably 5 to 100 $\mu$m.

The modified cross-linked polymer particles of this invention can be used as a protective layer provided on a heat-sensitive color-developing layer formed on a support.

The heat-sensitive color-developing layer formed on a support is obtained by coating a coating solution in which a known lueco dye, a developer, various other additives which are mentioned as necessary hereinafter and an adjuvant are dispersed in a suitable binder and drying the same.

The leuco dye may be a conventional one such as fluoran dye.

The developer incorporated into the coating solution is a compound which reacts with the leuco dye to develop the color.

As the binder, there can be used, for example, polyvinyl alcohol, starch and its derivatives, cellulose derivatives such as methoxycellulose, hydroxyethyl cellulose, carboxymethyl cellulose, methyl cellulose, ethyl cellulose and the like; sodium polyacrylate; polyvinylpyrrolidone, acrylic amide/acrylic acid ester copolymer, acrylic amide/acrylic acid ester/methacrylic acid terpolymer, an alkali salt of styrene/maleic anhydride copolymer, an alkali salt of isobutylene/maleic anhydride copolymer; polyacrylamide, sodium alginate, gelatine, casein and the like.

The above coating solution may contain, in addition to the leuco dye, developer and binder, if necessary, conventional additives such as photosensitizer, filler, surfactant, thermoplastic material and the like.

The protective layer set on the heat-sensitive color-developing layer is composed of an organic polymer comprising the modified cross-linked polymer particles of this invention, and can be formed by coating the aqueous organic polymer dispersion containing the modified cross-linked polymer particles on the heat-sensitive color-developing layer and then drying the same.

The aqueous organic polymer dispersion may be a conventional one such as acrylic emulsion, styrene-acrylic emulsion, styrene-vinyl acetate emulsion, SBS emulsion or the like.

The modified cross-linked polymer particles are contained in the aqueous organic polymer dispersion in a proportion of preferably 1 to 1,000 parts by weight, more preferably 10 to 500 parts by weight, per 100 parts by weight of the organic polymer solids. When the amount of the modified cross-linked polymer particles contained is less than 1 part by weight, it becomes difficult to obtain a heat-sensitive recording material excellent in sticking resistance aimed at by this invention, and when the amount exceeds 1,000 parts by weight, it becomes difficult to obtain a heat-sensitive recording material excellent in surface gloss.

The protective layer may contain, in addition to the modified cross-linked polymer particles, heat-meltable materials which have heretofore been known in the production of a heat-sensitive recording material and additives such as pH adjustor, viscosity adjustor, cross-linking agent and the like in such amounts that the performance of the protective layer is not adversely affected.

The heat-sensitive recording material is obtained by coating a heat-sensitive color-developing layer on a support such as paper, plastic film, synthetic paper or the like and further an aqueous organic polymer dispersion containing the modified cross-linked polymer particles of this invention thereon in a conventional manner and drying the resulting assembly in a conventional manner, and if necessary, calendering the dried assembly to form a protective layer.

In coating the aqueous dispersion of an organic polymer containing the modified cross-linked polymer particles, there may be used a bar coater, an air knife, a roll coater, a rod blade coater, doctor blade coater and the like.

The thickness of the protective layer is not critical; however, it is preferably 1 to 10 µm, more preferably 2 to 5 µm.

The modified cross-linked polymer particles of this invention are also suitable as a matting agent for a photographic paper.

The matting agent is applied in the form of a matting agent dispersion in water or an aqueous solvent in which the modified cross-linked polymer particles and, if necessary, a surfactant and a hydrophilic colloid are dispersed.

The modified cross-linked polymer particles are contained preferably in an amount of 0.1 to 2% by weight in the dispersion. When the amount of the modified cross-linked polymer particles is less than 0.1% by weight, the smoothness is inferior and when it is more than 2% by weight, the gloss is inferior.

The amount of the surfactant used is usually 0.001 to 2% by weight.

The hydrophilic colloid includes proteins such as gelatine, colloidal albumin, casein and the like; cellulose derivatives such as carboxymethyl cellulose and the like; sugar derivatives such as agar, sodium alginate, starch and the like; synthetic high polymers such as polyvinyl alcohol, polyacrylamide and the like, and gelatin is preferred. The amount of the hydrophilic colloid used is usually 0.1 to 50% by weight of the weight of the dispersion.

The matting agent can be prepared by dispersing the above-mentioned components and if necessary a film-hardening agent, a tackifier, an antistaic agent, an ultraviolet absorber, a plasticizer, a dye, a color former, a known matting agent and the like by a high speed rotary mixer, a homogenizer, an ultrasonic dispersion, a ball mill or the like.

The amount of the matting agent coated is preferably 0.5 to 300 mg, more preferably 0.5 to 200 mg, per $m^2$ of photographic paper. When the amount of the matting agent coated is less than 0.5 $mg/cm^2$, the smoothness is inferior and when it is more than 300 $mg/m^2$, the gloss is inferior.

The matting agent dispersion can be applied to any photographic paper such as a known photographic paper or the like.

The matting agent dispersion containing the modified cross-linked polymer particles of this invention can be applied to either the surface side or the back side of a photographic paper.

Incidentally, the photographic paper refers to a support having a photosensitive layer on one side.

Here, as the support, there can be used a paper having laminated to its surface a cellulose acetate film, a polyethylene terephthalate film, a polyethylene film, a polypropylene film or the like.

The photosensitive layer is a layer prepared by adding, to a hydrophilic colloid as mentioned above, a silver halide emulsion and if necessary a sensitizing coloring matter, a stabilizer, a surfactant, a development accelerator or the like.

Here, the silver halide emulsion is specifically an emulsion of a silver halide such as silver bromide prepared by a double jet method or the like.

The silver halide emulsion can be sensitized by a known method, for example, a chemical sensitization or a spectral sensitization and then used. In this chemical sensitization, a sulfur sensitizing agent or a noble metal or the like can be used, and in the spectral sensitization, a cyanine dye, a merocyanine dye or the like can be used.

The amount of the hydrophilic colloid contained in the photosensitive layer is about 0.2 to 6 $g/m^2$.

The photographic paper can be applied to any use such as a black-and-white photographic paper, a color photographic paper, a photosensitive material for photoengraving, a photosensitive material for silver complex diffusion transfer or the like.

According to the process of this invention, modified cross-linked polymer particles in which the surface of highly cross-linked particles has been modified can be produced stably and in a good efficiency. In particular, according to the process of this invention, particles having a wide molecular weight distribution can be easily produced and such particles having a broad molecular weight distribution can keep good flow property even when the solid content is increased.

The modified cross-linked polymer particles produced by the process of this invention can be suitably applied to various uses such as modification of a resin film, heat-sensitive recording material, matting agent for photographic paper and the like.

DESCRIPTION OF PREFERRED EMBODIMENTS

Examples of this invention are explained below; however, this invention should not be construed to be limited thereto. Incidentally, in the following, parts and % are by weight unless otherwise specified.

Method of measurement of particle size

The measurement of the weight average particle size of the modified cross-linked polymer particles was conducted by directly measuring the diameters of 1000 particles by a transmission electron microphotography (when the particle is not spherical, the long and short diameters thereof were measured and the average of the values obtained was used as the diameter) and calculating the average of the 1000 values obtained.

Method of observing dispersibility of particles in resin

The dispersibility of the modified cross-linked polymer particles in a resin was visually judged by observing by means of a transmission electron microscope a resin plate prepared by kneading the modified cross-linked polymer particles into a methyl methacrylate resin by a usually known kneader and then injection-molding the mixture.

EXAMPLE 1

In the first step, into a reactor were charged 10 parts of polystyrene particles having a weight average molecular weight of 15,000 and an average particle size of 0.25 µm, 5 parts of sodium dodecylbenzenesulfonate, 65 parts of divinylbenzene, 35 parts of styrene, 1 part of sodium persulfate and 700 parts of deionized water and they were subjected to polymerization with stirring at 80° C. for 1 hour while a nitrogen gas was blown thereinto.

Subsequently, in the second step, 1 part of styrene, 1 part of methacrylic acid, 0.5 part of 2-hydroxyethyl methacrylate and 0.5 part of sodium persulfate were added and then subjected to polymerization at 80° C. for a further 3 hours to complete the polymerization. The polymerization mixture was filtered through a stainless steel screen having a Tyler mesh of 500 (pore diameter: 25 µm) to remove coarse polymer particles, thereby producing modified cross-linked polymer particles in which the proportion of cross-linked polymer particles having particles sizes of more than 1 μm is less than 1%.

The average particle size of the modified cross-linked polymer particles obtained was measured to find that it was 0.56 μm.

EXAMPLE 2

The same procedure as in Example 1 was repeated, except that in the second step, 0.5 part of potassium persulfate was charged into the reactor and an emulsion prepared by mixing 100 parts of styrene, 50 parts of methyl methacrylate, 43 parts of n-butyl acrylate, 7 parts of acrylic acid, 3 parts of ethylene glycol methacrylate, 40 parts of deionized water and 0.5 part of dodecylbeznenesulfonic acid was continuously added over 3 hours to complete the polymerization, to produce a modified cross-linked polymer particles.

The average particle size of the modified cross-linked polymer particles obtained was measured to find that it was 0.7 μm, and the proportion of the cross-linked polymer particles having particle sizes of more than 1 μm was less than 1%.

EXAMPLE 3

The same procedure as in Example 1 was repeated, except that in the second step, 0.5 part of potassium persulfate was charged into the reactor, 95 parts of styrene and 5 parts of glycidyl methacrylate were continuously added over 2 hours to complete the polymerization, and then the polymerization mixture was filtered through a depth filter (filter material: polypropylene having a pore diameter of 0.5 μm), after which the reaction temperature was lowered to 70° C., ammonia was added until the pH became 11 and then reaction was conducted for 24 hours, to produce modified cross-linked polymer particles.

The modified cross-linked polymer particles obtained were purified and thereafter subjected to measurement of infrared absorption spectrum to confirm the presence of amino group.

The average particle size of the modified cross-linked polymer particles obtained was measured to find that it was 0.6 μm, and the proportion of the cross-linked polymer particles having particle sizes of more than 1 μm was less than 1%.

EXAMPLE 4

In the first step, into a reactor were charged 0.06 part of polystyrene particles having a weight average molecular weight of 10,000 and a weight average particle size of 0.03 μm (referred hereinafter as the particles A), 0.1 part of sodium dodecylbenzenesulfonate, 1 part of sodium persulfate and 500 parts of deionized water, and the temperature of the contents of the reactor was elevated to 80° C. with stirring while a nitrogen gas was blown thereinto. Subsequently, into another reactor were charged 70 parts of divinylbenzene, 30 parts of styrene, 0.5 part of sodium dodecylbenzenesulfonate, 6 parts of the particles A and 200 parts of deionized water, and the mixture in the reactor was fully emulsified, and then the resulting emulsion was continuously charged into the first reactor over 3 hours and the contents of the first reactor were subjected to polymerization.

Subsequently, in the second step, 0.5 part of styrene, 0.5 part of methacrylic acid and 0.5 part of sodium persulfate were added and then subjected to polymerization at 80° C. for a further 3 hours to complete the polymerization to obtain cross-linked polymer particles.

The weight average particle size of the cross-linked polymer particles obtained was measured to find that Dw was 0.13 μm, and the proportion of the particles having sizes of more than 1.3×Dw (0.169 μm) was 0.8% by weight, the proportion of the particles having sizes of less than 0.8×Dw (0.104 μm) was 8% by weight, and the proportion of the particles having sizes of 0.9×Dw to 1.1×Dw (0.12 to 0.14 μm) was 42.5% by weight, and thus the particles had a broad particle size distribution.

EXAMPLE 5

In the first step, 35 parts of divinylbenzene (commercially available product having a purity of 55% and containing 40% of ethylvinylbenzene and 5% of impurities), 55 parts of styrene, 10 parts of acrylic acid, 30 parts of sodium dodecylbenzenesulfonate, 900 parts of deionized water and 1 part of sodium persulfate were charged into a 10-liter reactor and then subjected to polymerization with stirring at 80° C. for 1 hour to obtain seed polymer particles.

The average particle size of the seed polymer particles obtained was measured to find that it was 0.028 μm. The said seed polymer particles are referred to hereinafter as the seed polymer particles (a).

Subsequently, in the second step, 0.5 part (as solids) of the cross-linked polymer particles (a), 0.1 part of sodium dodecylbenzenesulfonate, 0.6 part of potassium persulfate and 100 parts of deionized water were charged into a 10-liter reactor purged with nitrogen, and then the temperature of the contents of the reactor was elevated to 75° C. with stirring under a nitrogen atmosphere.

Subsequently, a monomer mixture (emulsion) consisting of 94 parts of styrene, 6 parts of methacrylic acid, 30 parts of deionized water, 0.1 part of sodium dodecylbenzenesulfonate and 1.2 parts (as solids) of the seed polymer particles (a) was continuously added at a constant feed rate in 4 hours. Incidentally, the polymerization conversion when a half amount of the monomer mixture had been added and the polymerization conversion when the whole amount of the monomer mixture had been added were measured to find that they were 86% and 92%, respectively. After the addition of the whole amount of the monomer mixture, polymerization was effected at 75° C. for a further 3 hours to be completed with a good polymerization stability (the final polymerization conversion was 99%), thereby obtaining an emulsion (referred to hereinafter as the emulsion [1]).

A mixture consisting of 6 parts (as solids) of the emulsion [1], 40 parts of styrene, 60 parts of divinylbenzene (commercially available product having a purity of 81% and containing 18% of ethylvinylbenzene and 1% of impurities), 400 parts of deionized water and 0.5 part of ammonium persulfate was stirred at 40° C. for 2 hours to allow the monomers to be absorbed in the particles in the emulsion [1]. Subsequently, the monomers were polymerized at 80° C. for 5 hours to obtain cross-linked polymer particles. Thereafter, 1 part of styrene, 1 part of methacrylic acid and 0.5 part of sodium persulfate were added and subjected to polymerization at 80° C. for 3 hours to obtain an emulsion of modified cross-linked polymer particles.

EXAMPLE 6

The same procedure as in Example 1 was repeated, except that 200 parts of β-(perfluorooctyl)ethyl acrylate was substituted for the styrene, methacrylic acid and 2-hydroxyethyl methacrylate to complete the polymerization, thereby producing modified cross-linked polymer particles.

The average particle size of the modified cross-linked polymer particles obtained was measured to find that it was 0.6 µm.

The resulting cross-linked polymer particle slurry was subjected to centrifugal washing and thereafter to elementary analysis by ESCA to confirm the presence of fluorine element.

EXAMPLE 7

Polymer particles (A) were obtained in the same manner as in the first step of Example 1 and then dried. Subsequently, 100 parts of the polymer particles (A) and 5 parts of bis(heptafluorobutyryl) peroxide were fed to a reactor charged with Fluon 113 (a trade name of Imperial Chemical Industries Ltd. for a fluoroplastic) and then subjected to reaction with stirring at 40° C. for 5 hours in a nitrogen atmosphere to obtain modified cross-linked polymer particles.

The average particle size of the modified cross-linked polymer particles obtained was measured to find that it was 0.51 µm. The modified cross-linked polymer particles obtained were subjected to elementary analysis by ESCA to confirm the presence of fluorine element.

EXAMPLE 8

Cross-linked polymer particles were produced in the same manner as in the first step of Example 1. Subsequently, the temperature of the reactor was lowered to 25° C. and the pH was adjusted to 8.0, after which 100 parts of diethylethoxysilane was added and the resulting mixture was strongly stirred for about 30 minutes. Subsequently, the temperature of the reactor was elevated to 70° C. and the mixture was subjected to reaction for 3 hours to complete the condensation, thereby producing modified cross-linked polymer particles. In this dispersion, no generation of coagulum was observed.

The average particle size of the modified cross-linked polymer particles obtained was measured to find that it was 0.55 µm.

The modified cross-linked polymer particles obtained were subjected to centrifugal washing and then to elementary analysis by ESCA to confirm the presence of Si element.

EXAMPLE 9

The temperature of the reactor into which 100 parts of the cross-linked polymer particles obtained in the first step of Example 1 had been charged was elevated to 80° C., and 0.5 part of sodium persulfate was added thereto. Thereafter, 35 parts of methyl methacrylate, 62 parts of styrene and 3 parts of methacrylic acid were continuously added over 1 hour to complete the polymerization, thereby producing modified cross-linked polymer particles. The reactor was thereafter cooled and kept at 25° C. Thereafter, in the same manner as in Example 9, methyltriethoxysilane was subjected to condensation reaction to produce modified cross-linked polymer particles.

The average particle size of the modified cross-linked polymer particles obtained was measured to find that it was 0.7 µm.

The modified cross-linked polymer particles obtained were subjected to centrifugal washing and thereafter to elementary analysis by ESCA to confirm the presence of Si element.

COMPARATIVE EXAMPLE 1

In the same manner as in the first step of Example 1, cross-linked polymer particles (average particle size: 0.56 µm) were obtained.

COMPARATIVE EXAMPLE 2

In the same manner as in the first step of Example 1, cross-linked polymer particles having an average particle size of 0.56 µm were obtained.

To a slurry of the cross-linked polymer particles in ethylene glycol obtained was added a copolymer of styrene and ammonium acrylate as a surface treating agent in an amount of 10% of the weight of the cross-linked polymer particles, and then subjected to grinding treatment using a sand grinder to obtain polymer particles having an average particle size of 0.56 µm.

TEST EXAMPLE

The cross-linked polymer particles obtained in Examples 1 to 9 and Comparative Examples 1 and 2 were evaluated as to the following items to obtain the results shown in Table 1.

Shape of particle: The shape of particle obtained was observed by TEM.

Agglomerate: Presence or absence of agglomerate in the particles obtained was observed.

Flow property: Dispersion of the particles obtained in water was concentrated until the solid concentration became 60% during which the flow property was observed.

Particle size distribution: Diameters of 5,000 particles on a microphotograph taken using a transmission electron microscope were measured and then the particle size distribution, in terms of the proportions of the particles each having sizes (diameters) of more than 1.3×Dw, 0.9×Dw to 1.1×Dw and less than 0.8×Dw, was obtained therefrom.

TABLE 1

| | Weight average particle size Dw (µm) | Particle size distribution | | |
|---|---|---|---|---|
| | | Large particle size more than 1.3 × Dw | 0.9 × Dw– 1.1 × Dw | Small particle size Less than 0.8 × Dw |
| Ex. 1 | 0.56 | 0 | 99.0 | 1.0 |
| Ex. 2 | 0.7 | 0 | 98.2 | 1.8 |
| Ex. 3 | 0.6 | 0 | 99.0 | 1.0 |
| Ex. 4 | 0.13 | 0.8 | 42.5 | 8.0 |
| Ex. 5 | 0.41 | 0 | 50.0 | 8.0 |
| Ex. 6 | 0.6 | 0 | 98.5 | 1.5 |
| Ex. 7 | 0.51 | 0 | 99.0 | 1.0 |
| Ex. 8 | 0.55 | 0 | 98.0 | 2.0 |
| Ex. 9 | 0.7 | 0 | 98.0 | 2.0 |
| Comp. Ex. 1 | 0.56 | 0 | 99.0 | 1.0 |
| Comp. Ex. 2 | 0.56 | 0 | 99.0 | 1.0 |

| | Shape of particle | Agglomerate | Flow property |
|---|---|---|---|
| Example 1 | Sphere | Nothing | Gelled |
| Example 2 | Sphere | Nothing | during |
| Example 3 | Sphere | Nothing | concentration |
| Example 4 | Sphere | Nothing | Good |
| Example 5 | Sphere | Nothing | Good |

TABLE 1-continued

| | | | |
|---|---|---|---|
| Example 6 | Sphere | Nothing | Gelled during |
| Example 7 | Sphere | Nothing | concentration |
| Example 8 | Sphere | Nothing | Gelled during |
| Example 9 | Sphere | Nothing | concentration |
| Comp. Ex. 1 | Sphere | Nothing | Gelled during |
| Comp. Ex. 2 | Sphere having protrusions | Nothing | concentration |

APPLICATION EXAMPLE 1

With 100 parts of polypropylene (melt index: 2 g/10 min) were mixed 0.03 part of calcium stearate and 0.5 part (as solids) of the modified cross-linked polymer particles obtained in Example 1, 4 or 5 or Comparative Example 2, and the mixture was melt-extruded to form pellets. The resulting pellet-shaped mixture was formed into a sheet-like film by means of an extruder and the sheet-like film obtained was stretched by 5 times in longitudinal direction and 10 times in the transverse direction to prepare an oriented polypropylene film having a thickness of 20 μm (referred to hereinafter as the film 1, 2, 3 or 4, respectively).

Each of the oriented polypropylene films obtained was evaluated as to transparency, anti-blocking property and slip property. The results obtained are shown in Table 2.

Incidentally, the evaluation was effected according to the following methods.

(1) Transparency

Haze (%) was measured according to ASTM D-1003.

(2) Anti-blocking property

Two sheets of film (80×120 mm) were placed one on the other along the length in the state that the end of one sheet was shifted 20 mm from the end of the other sheet (namely, the overlapped film area was 80×100 mm), and the resulting assembly was allowed to stand in an atmosphere at 50° C. for 24 hours while a load of 70 g/cm$^2$ was applied thereto, after which the shear peeling strength (g/cm$^2$) was measured using a tensile tester.

(3) Slip property

The coefficient of kinetic friction was measured according to ASTM D-1894.

TABLE 2

| Film No. | Modified cross-linked polymer particle | Haze (%) | Anti-blocking property (g/cm$^2$) | Coefficient of kinetic friction |
|---|---|---|---|---|
| 1 | Example 1 | 3.8 | 30 | 0.39 |
| 2 | Example 4 | 2.8 | 35 | 0.34 |
| 3 | Example 5 | 2.9 | 29 | 0.39 |
| 4 | Comp. Ex. 2 | 5.0 | 52 | 0.60 |

APPLICATION EXAMPLE 2

| | | |
|---|---|---|
| Liquid A: | 3-Cyclohexylamino-6-chlorofluoran | 30 parts |
| | 10% Polyvinyl alcohol | 30 parts |
| | Water | 40 parts |
| Liquid B: | Benzyl p-hydroxybenzoate | 30 parts |
| | 10% Polyvinyl alcohol | 25 parts |
| | Water | 45 parts |
| Liquid C: | Lauric acid amide | 25 parts |
| | Titanium oxide | 30 parts |
| | 10% Polyvinyl alcohol | 20 parts |
| | Water | 25 parts |

Each of the above liquids A, B and C was dispersed on a sand mill so that the average particle size became 2 μm or less, and 30 parts of the liquid A, 60 parts of the liquid B and 10 parts of the liquid C were mixed to prepare a coating solution for heat-sensitive color-developing layer. This coating solution was coated on one side of a wood free paper having a basis weight of 52 g/m$^2$ so that the amount of the coating after drying became 6 g/m$^2$, and then dried.

Subsequently, 17.5 parts of the modified cross-linked polymer particles obtained in Example 2, 3 or 8 or the cross-linked polymer particles obtained in Comparative Example 1 was mixed with 100 parts of an aqueous resin dispersion (commercially available acrylic emulsion) and then water was added thereto to adjust the solid concentration to 15%. The resulting dispersion was applied onto a heat-sensitive color-developing layer so that the weight of the coating after drying became 5 g/m$^2$, dried and then surface-treated by a super calender so that the surface smoothness became about 2,000 sec or more to obtain heat-sensitive recording materials (referred to hereinafter as the heat-sensitive recording materials 1 to 4, respectively).

The heat-sensitive recording materials 1 to 4 obtained were subjected to measurement of sticking resistance, 600 specular gloss of black solid printing face and blackness using the following machines. The results obtained are shown in Table 3. Sticking resistance: Black solid printing was conducted using the copying function of a FAX manufactured by RICOH CO., LTD. and the sticking resistance was evaluated based on the volume of sticking sound. Gloss: 60° specular gloss was measured using a handy glossmeter manufactured by SUGA SHIKENKI. Blackness: Measured using a Macbeth densitometer manufactured by Kollmorgen Co.

TABLE 3

| Heat-sensitive material No. | Modified cross-linked polymer particle | Sticking resistance | Setting face gloss | Blackness |
|---|---|---|---|---|
| 1 | Example 2 | Small | 84 | 1.58 |
| 2 | Example 3 | Small | 81 | 1.60 |
| 3 | Example 8 | None | 80 | 1.57 |
| 4 | Comp. Ex. 1 | Small | 65 | 1.40 |

APPLICATION EXAMPLE 3

Using the modified cross-linked polymer particles obtained in Examples 1, 6, 7, 8 and 9 and Comparative Example 1, photographic papers 1 to 6, respectively, were produced in the following manner.

(1) Preparation of photosensitive layer material

A silver halide emulsion containing 15 mole % of silver bromide having an average particle size of 0.3 μm prepared by the double jet method was chemically amplified in a conventional manner and thereto were added a sensitizing coloring matter, a stabilizer, a film-hardening agent and a surfactant.

(2) Preparation of modified cross-linked polymer particles-containing composition To 98.3 parts of a 7% aqueous gelatine solution were added 0.5 part of the modified cross-linked polymer particles, 1 part of a film-hardening agent and 0.2 part of a surfactant and they were mixed.

(3) Preparation of photographic paper

The photosensitive layer material obtained in (1) above was coated on one side of a support consisting of a paper to both surfaces of which a polyethylene terephthalate film had been laminated so that the amount of silver became 3.2 g/m² and then dried, after which the composition obtained in (2) above was coated thereon by the slide hopper method so that the amount of gelatine became 0.8 g/m², and then dried.

Subsequently, the composition obtained in (2) above was coated on the other side of the support so that the amount of gelatine became 0.8 g/m², and then dried to obtain photographic papers 1 to 6.

Thereafter, the photographic papers obtained were evaluated as to haze value, blocking degree and coating state in the following manner to obtain the results shown in Table 4.

Haze value

An unexposed photographic paper was developed with a commercially available lith developer at 20° C. for 2 minutes and 30 seconds, fixed, water-washed and dried, and thereafter, the transparency was measured by a haze meter.

Haze value=(scattered light/total transmitted light)×100 (%)

The smaller the haze value, the better the transparency and the better the gloss of photographic paper became.

Blocking degree

The photographic paper was cut to a size of 5 cm×5 cm and a pair of two sheets obtained were conditioned at a relative humidity (RH) of 80% at 35° C. for 24 hours, and thereafter, the photosensitive layer-forming side of one sheet of the same pair was put on the back of the other of the same pair, after which the resulting assembly was allowed to stand under a load of 1 kg at 80% RH at 35° C. for 24 hours. Subsequently, the load was removed and the area of the adhered portion remaining on the surface of the photographic paper was measured. The evaluation ratings were as follows:

Rank A: The area of adhered portion was 0–25%.
Rank B: The area of adhered portion was 26–50%.
Rank C: The area of adhered portion was 51–75%.
Rank D: The area of adhered portion was 76–100%.

Coating state

Visually observed.

TABLE 4

| Photographic paper No. | Modified cross-linked polymer particle | Haze (%) | Blocking degree | Coating state |
| --- | --- | --- | --- | --- |
| 1 | Example 1 | 6.3 | B | Good |
| 2 | Example 6 | 5.2 | A | Good |
| 3 | Example 7 | 5.8 | A | Good |
| 4 | Example 8 | 5.3 | A | Good |
| 5 | Example 9 | 5.0 | A | Good |
| 6 | Comp. Ex. 2 | 9.8 | C | Pin hole |

What is claimed is:

1. A process for producing modified cross-linked polymer particles, comprising the steps of:
   (1) polymerizing a monomer mixture comprising 50% by weight or more of at least one cross-linking monomer selected from the group consisting of divinylbenzene, ethylene glycol dimethacrylate and trimethylolpropane trimethacrylate in the presence of seed polymer particles to form cross-linked polymer particles (A), wherein 3–100 parts by weight of said cross-linking monomer is added to one part by weight of said seed polymer particles; and
   (2) polymerizing 0.01 to 900 parts by weight of a monomer component (B) containing 50% by weight or more of at least one monomer selected from the group consisting of aromatic monoalkenyl compounds, acrylic acid esters, methacrylic acid esters, fluoroalkyl acrylates, fluoroalkyl methacrylates, unsaturated carboxylic acids, conjugated diene compounds, vinyl esters and organosilane compounds, in the presence of 100 parts by weight of said cross-linked polymer particles (A).

2. The process of claim 1, wherein said cross-linked polymer particles (A) comprise a copolymer of divinylbenzene and ethylvinylbenzene.

3. The process of claim 1, wherein said monomer component (B) consists of at least one monomer selected from the group consisting of aromatic monoalkenyl compounds, acrylic acid esters, methacrylic acid esters, unsaturated carboxylic acids, conjugated diene compounds and vinyl esters.

4. The process of claim 1, wherein said monomer component (B) further comprises 0.05 to 20% by weight of a functional group-containing monomer.

5. The process of claim 1, wherein said monomer component (B) consists of 80–99.5% by weight of at least one monomer selected from the group consisting of styrene, ethylvinylbenzene, methyl methacrylate and butyl acrylate and 0.05 to 20% by weight of at least one monomer selected from the group consisting of acrylic acid, methacrylic acid and maleic acid.

6. The process of claim 1, wherein said cross-linked polymer particles (A) and said monomer component (B) are in a weight ratio of 100/0.5–200.

7. The process of claim 1, wherein the modified cross-linked polymer particles have a weight average particle size of 0.05–10 microns.

8. The process of claim 7, wherein the modified cross-linked polymer particles have a weight average particle size of 0.01–2 micron.

9. The process of claim 1, wherein the proportion of modified cross-linked polymer particles having a weight average particle size of more than 1 micron is 1% by weight or less.

10. The process of claim 1, wherein the weight average particle size Dw of the modified cross-linked polymer particles is in the range of 0.05–2 micron and the particle size distribution of the modified cross-linked polymer particles satisfies the following conditions (1) and (2):
    (1) the proportion of polymer particles having particle sizes of more than 1.3×Dw is 5% by weight or less of the weight of the total polymer particles, and
    (2) the proportion of polymer particles having particle sizes of less than 0.8×Dw is 1% by weight or more, but 35% by weight or less of the weight of the total polymer particles.

11. The process of claim 1, wherein said monomer component (B) contains 0% by weight cross-linking monomers.

12. The process of claim 1, wherein the ratio of the weight average particle size Dw to the number average particle size Dn of the modified cross-linked polymer particles is 1.2–3.0.

13. The process of claim 1, wherein a portion of said seed polymer particles and a polymerization initiator are mixed in a reactor and the remaining polymer seed particles and said cross-linking monomer are added to the reactor subsequently, continuously or intermittently.

14. The process of claim 1, wherein said monomer mixture comprises 80% by weight or more of said cross-linking monomer.

15. A process for producing modified cross-linked polymer particles, consisting of the steps:

(1) polymerizing the monomer mixture comprising 50% by weight or more of at least one cross-linking monomer selected from the group consisting of divinylbenzene, ethylene glycol dimethacrylate and trimethylolpropane trimethacrylate to form cross-linked polymer particles (A); and (2) polymerizing 0.01 to 900 parts by weight of a monomer component (B) in the presence of 100 parts by weight of said cross-linked polymer particles (A), wherein said monomer component (B) contains 50% by weight or more of at least one monomer selected from the group consisting of aromatic monoalkenyl compounds, acrylic acid esters, methacrylic acid esters, fluoroalkyl acrylates, fluoroalkyl methacrylates, unsaturated carboxylic acids, conjugated diene compounds, vinyl esters and organosilane compounds.

16. The process of claim 15, wherein said monomer mixture comprises 80% by weight or more of said cross-linking monomer.

17. The process of claim 15, wherein said monomer component (B) further comprises 0.05 to 20% by weight of a functional group-containing monomer.

18. The process of claim 15, wherein said monomer component (B) consists of 80–99.5% by weight of at least one monomer selected from the group consisting of styrene, ethylvinylbenzene, methyl methacrylate and butyl acrylate and 0.05 to 20% by weight of at least one monomer selected from the group consisting of acrylic acid, methacrylic acid and maleic acid.

19. The process of claim 15, wherein the modified cross-linked polymer particles have a weight average particle size of 0.05–10 microns.

20. The process of claim 15, wherein the weight average particle size Dw of the modified cross-linked polymer particles is in the range of 0.05–2 micron and the particle size distribution of the modified cross-linked polymer particles satisfies the following conditions (1) and (2):

(1) the proportion of polymer particles having particle sizes of more than 1.3×Dw is 5% by weight or less of the weight of the total polymer particles, and (2) the proportion of polymer particles having particle sizes of less than 0.8×Dw is 1% by weight or more, but 35% by weight or less of the weight of the total polymer particles.

* * * * *